(12) United States Patent
Thangamani et al.

(10) Patent No.: US 11,494,605 B2
(45) Date of Patent: Nov. 8, 2022

(54) LAMINATED GLAZING WITH EMBEDDED DATA TRANSPONDER

(71) Applicant: SAINT-GOBAIN GLASS FRANCE, Courbevoie (FR)

(72) Inventors: Arunvel Thangamani, Tamil Nadu (IN); Samson Richardson D, Tamil Nadu (IN); Jyothi Latha Tamalapakula, Tamil Nadu (IN); Kasinath N, Tamil Nadu (IN); Robin C Jayaram, Tamil Nadu (IN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/620,310

(22) PCT Filed: Jun. 8, 2018

(86) PCT No.: PCT/IN2018/050379
§ 371 (c)(1),
(2) Date: Dec. 6, 2019

(87) PCT Pub. No.: WO2018/225095
PCT Pub. Date: Dec. 13, 2018

(65) Prior Publication Data
US 2020/0193259 A1 Jun. 18, 2020

(30) Foreign Application Priority Data

Jun. 9, 2017 (IN) .............................. 201741020258

(51) Int. Cl.
*G06K 19/077* (2006.01)
*B32B 17/10* (2006.01)
(Continued)

(52) U.S. Cl.
CPC .. *G06K 19/07773* (2013.01); *B32B 17/10018* (2013.01); *B32B 17/10036* (2013.01);
(Continued)

(58) Field of Classification Search
CPC .......... G06K 19/07773; G06K 19/0772; B32B 17/10018; B32B 17/10036;
(Continued)

(56) References Cited

U.S. PATENT DOCUMENTS 6,275,157 B1 8/2001 Mays et al.
7,825,854 B2 11/2010 Benavides
(Continued)

OTHER PUBLICATIONS

International Search Report and the Written Opinion of the International Searching Authority as issued in International Application No. PCT/IN2018/050379, dated Aug. 10, 2018.

*Primary Examiner* — Michael G Lee
*Assistant Examiner* — David Tardif
(74) *Attorney, Agent, or Firm* — Pillsbury Winthrop Shaw Pittman LLP

(57) ABSTRACT

A laminated glazing includes a first substrate having an outer face and an inner face, one or more interlayers disposed on the inner face of the first substrate, a second substrate disposed on the interlayer and at least one data transponder device. The date transponder device includes an antenna and an integrated circuit that is provided between the first substrate and the second substrate Optionally, one or more heating elements is/are provided between the first substrate and the second substrate and spaced around the data transponder device at a pre-defined distance for rapidly heating the antenna the data transponder.

32 Claims, 8 Drawing Sheets

(51) Int. Cl.
   *B32B 27/30*   (2006.01)
   *B32B 27/36*   (2006.01)
(52) U.S. Cl.
   CPC .. *B32B 17/10293* (2013.01); *B32B 17/10678* (2013.01); *B32B 27/304* (2013.01); *B32B 27/365* (2013.01); *G06K 19/0772* (2013.01); *B32B 2369/00* (2013.01); *B32B 2457/00* (2013.01)
(58) Field of Classification Search
   CPC ........ B32B 17/10293; B32B 17/10678; B32B 27/304; B32B 27/365; B32B 2369/00; B32B 2457/00
   USPC .......................................... 235/492
   See application file for complete search history.

(56) References Cited

U.S. PATENT DOCUMENTS

| | | | |
|---|---|---|---|
| 8,810,462 B2* | 8/2014 | Goldberger | H01Q 1/1271 156/102 |
| 9,403,477 B2 | 8/2016 | Richard et al. | |
| 2007/0120756 A1* | 5/2007 | Ogino | H01Q 1/1271 343/704 |
| 2015/0151611 A1 | 6/2015 | Gansen et al. | |
| 2016/0134008 A1* | 5/2016 | Kim | H01Q 1/1271 343/711 |
| 2017/0106634 A1* | 4/2017 | Lu | B32B 27/22 |
| 2020/0321301 A1* | 10/2020 | Mitarai | H01L 25/18 |

* cited by examiner

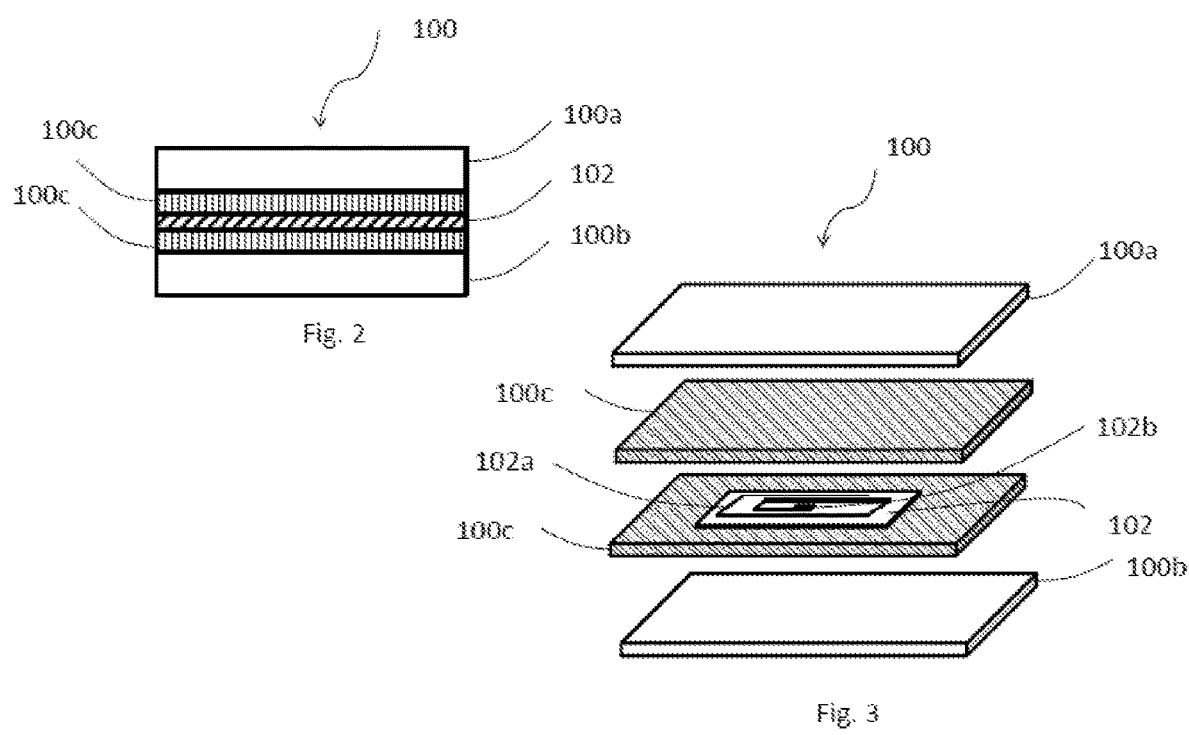

LAMINATED GLAZING WITH EMBEDDED DATA TRANSPONDER

CROSS-REFERENCE TO RELATED APPLICATIONS

This application is the U.S. National Stage of PCT/IN2018/050379, filed Jun. 8, 2018, which in turn claims priority to Indian patent application number 201741020258 filed Jun. 9, 2017. The content of these applications are incorporated herein by reference in their entireties.

TECHNICAL FIELD

The present disclosure relates generally to a laminated glazing of a vehicle embedded with one or more data transponders and more particularly to a laminated glazing with better readability performance of the data transponders in extreme weather conditions.

BACKGROUND

Background description includes information that may be useful in understanding the present disclosure. It is not an admission that any of the information provided herein is prior art or relevant to the presently claimed invention, or that any publication specifically or implicitly referenced is prior art.

Currently RFID and NFC tags provided on the vehicle windshields in the form of stickers and used as a data storage device to store vehicle related data or information.

However, these RFID or NFC stickers come with several limitations. For instance, these stickers can be removed or tampered easily due to ageing, weathering, theft, or damage due resulting from external factors such as wind, rain, or vandalism. Moreover, it is very difficult to stick these stickers having the data transponders, once peeled off from the vehicle windshield. Thus results in wastage of these stickers. The other limitation is the durability of the antenna, which has the tendency to degrade in terms of readability over a period. As a result, vehicle operators must periodically replace or cover over expired stickers with new stickers. The difficulty of removing expired stickers is also a disadvantage, as it is difficult to remove adhesive or sticky residue or remnants of the sticker from the automobile glazing.

U.S. Pat. No. 6,275,157 to May's et al. discloses a data transponder comprising a glass panel and RFID device, which is at least partially embedded in the glass panel. In an embodiment, RFID device is disposed between adjacent ones of the glass layers and becomes embedded therein upon lamination of the glass layers together.

The above mentioned prior art primarily aimed at integrating an RFID transponder/device on the glass panel. U.S. patent '157 neither discloses a heating element associated with RFID device nor discloses a NFC device. In addition to this, there are many significant drawbacks in this prior-art. Firstly, '157 is not dealing with improving durability and data readability of the data transponders in harsh conditions such as colder weather conditions wherein temperature goes well below 0° c. Moreover, the above mentioned prior art is not providing the ideal location for placing the data transponders within the laminated glazing.

As a result, it would be desirable to provide a windshield with data transponder devices having enhanced durability and data readability performance in extreme weather conditions. The current disclosure provides an effective way of enhancing durability of data transponders and data readability of these transponders by integrating a heating element in and around the region close to these data transponders.

SUMMARY OF THE DISCLOSURE

Other features and aspects of this disclosure will be apparent from the following description and the accompanying drawings. The current disclosure provides a laminated glazing 100 comprising a first substrate 100a consisting an outer face and an inner face and one or more interlayers 100c disposed on the inner face of the first substrate 100a. A second substrate 100b disposed on the interlayer 100c. At least one data transponder device 102, 104 comprising an antenna 102a, 104a and an integrated circuit 102b, 104b disposed on one or more interlayer 100c, wherein one or more interlayer 100c placed in between the first and second substrate 100a, 100b.

The current disclosure further provides a laminated glazing 100 comprising a first substrate 100a consisting an outer face and an inner face and one or more interlayers 100c disposed on the inner face of the first substrate 100a. A second substrate 100b disposed on the interlayer 100c consisting an outer face and an inner face. At least one data transponder device 102, 104 comprising an antenna 102a, 104a and an integrated circuit 102b, 104b disposed on one or more interlayer 100c, wherein one or more interlayer 100c is placed in between the first and second substrate 100a, 100b. One or more heating element 106 provided between the first substrate 100a and the second substrate 100b, wherein the heating element 106 is positioned around the data transponder device 102 at a pre-defined distance therein.

The method of manufacturing a laminated glazing 100 is provided comprising the steps of assembling of first and second substrate 100a, 100b along with one or more data transponder device 102, 104 at a pre-defined locations to one or more interlayers 100c to form a laminate assembly 1010. After this step, de-airing of the laminated assembly based on the size, number and type of data transponder device 1020. Thereafter autoclaving the de-aired laminated assembly 1030 in successive time steps involving multiple pressure and temperature values to form the data transponder device 102, 104 integrated laminated glazing 100.

BRIEF DESCRIPTION OF THE DRAWINGS

Embodiments are illustrated by way of example and are not limited in the accompanying figures.

FIG. 2 illustrates a cross section view of a laminated glazing, according to an embodiment of the present disclosure;

FIG. 3 illustrates an exploded view of a laminated glazing, according to an embodiment of the present disclosure;

Figure 1:
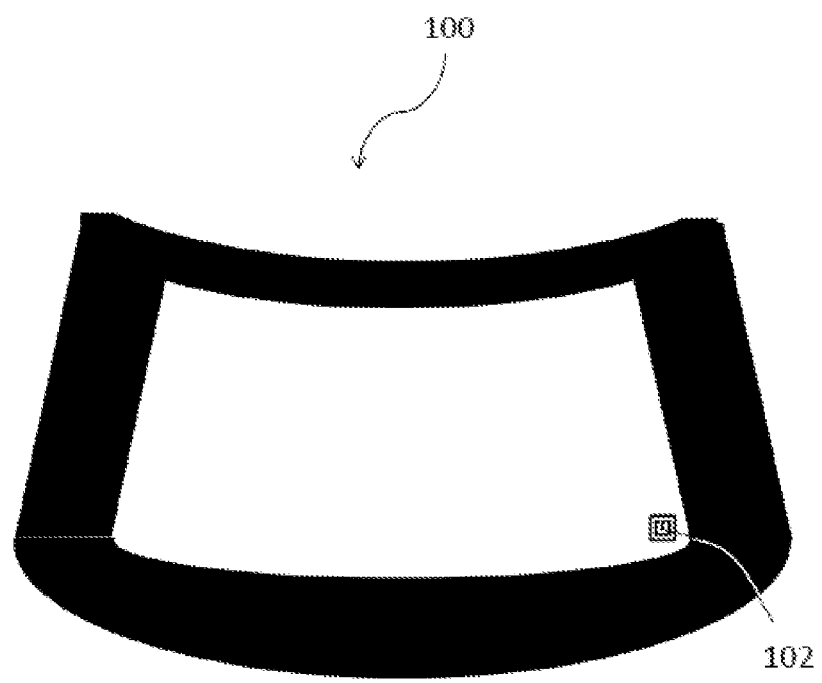
FIG. 1 illustrates a plan view of a laminated glazing according to the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The present invention is now discussed in more detail referring to the drawings that accompany the present application. In the accompanying drawings, like and/or corresponding elements are referred to by like reference numbers.

Wherever possible, the same reference numbers will be used throughout the drawings to refer to the same or the like parts. The present disclosure is to provide an improved automobile glazing incorporating other functions in addition to the usual one. The present disclosure further provides an improved automobile glazing embedded with one or more data transponders and more particularly to a laminated glazing with better readability performance of the data transponders with in extreme weather conditions.

FIG. 1 illustrates a laminated glazing 100 of the current disclosure embedded with a data transponder device. In an embodiment, the data transponder device is a near field communication (NFC) device 102.

FIG. 2 illustrates a cross section view of laminated glazing 100. In an embodiment, one or both the first substrate 100a and second substrate 100b is a glass or a polymer. The polymer is polycarbonate (PC) or polypropylene (PP). The one or both the first substrate 100a and second substrate 100b can be of various shapes such as flat, curved, wedged or contoured. Optionally, at least the first substrate 100a, the second substrate 100b or both the first and the second substrate 100a, 100b may be strengthened either chemically or thermally. The first substrate 100a, the second substrate 100b or both the first and the second substrate 100a, 100b may have a thickness of at least 0.5 mm. One or more interlayers 100c provided between the first substrate 100a and second substrate 100b to form the laminated assembly. NFC device 102 is integrated between the first substrate 100a, second substrate 100b, or one or more interlayers 100c.

In an embodiment one or more interlayers 100c may be made up of polymers with same or different mechanical and chemical properties. The one or more interlayers 100c comprises a polymer selected from the group consisting of poly vinyl butyral (PVB), polycarbonate (PC), acoustic PVB, shade band PVB, thermal control PVB, ethylene vinyl acetate (EVA), thermoplastic polyurethane (TPU), ionomer, a thermoplastic material, polybutylene terephthalate (PBT), polyethylenevinylacetate (PET), polyethylene naphthalate (PEN), polyvinyl chloride (PVC), polyvinyl fluorides (PVf), polyacrylate (PA), polymethyl methacrylate (PMMA), polyurethane (PUR) and combinations thereof.

The interlayers 100c either has uniform thickness throughout or non-uniform thickness. The interlayer 100c interlayers may have a thickness of at least 0.38 mm. Optionally, the interlayers 100c are modified to accommodate one or more data transponders such as NFC device 102 and RFID tag 104.

Generally, the interlayer 100c is modified to assemble thicker data transponders in the laminated glazing 100. The interlayer 100c is modified by either cutting, pressing, grinding, heating or combination thereof. The cutting of interlayer 100c is done manually or automatically by means of cutting fixtures. The grinding of interlayer 100c is done by means of abrasive wheel or pencil grinders which are electrically or pneumatically operated. Further, the interlayer 100c can be modified by heating. In this, the data transponder is disposed on the interlayer 100c by means of a hot stamping tool in which stamping is done by means of physical pressure and at a defined temperature. In some instances, the modification of interlayer 100c by heating method is also done by means of having an adhesive backing in the data transponder 102 along with hot stamping to ensure much higher bonding between interlayer 100c and the data transponder 102.

FIG. 3 illustrates an exploded view of a laminated glazing 100. The laminated glazing 100 comprises first substrate 100a, second substrate 100b, two interlayers 100c and a NFC device 102. The interlayers 100c are provided on the inner face of the first substrate 100a. The interlayers 100c is intermediate the first and second substrates 100a and 100b respectively.

FIG. 3 further illustrates NFC device 102 comprising of an antenna 102a and an integrated circuit 102b. In an embodiment, the data transponder devices such as NFC device 102 and RFID tag 104 (not shown) is disposed between the first substrate 100a and the second substrate 10013, or integral to one or both the first substrate 100a and the second substrate 100b, or disposed between one or more interlayers 100c, or integral to one or more interlayers 100c. The data transponder devices 102, 104 has a thickness of at least 5% of interlayer 100c thickness. More specifically, the data transponder devices 102, 104 may has a thickness of at least 50 µm to 500 µm.

The operating frequency of NFC device 102 and RFID tag 104 ranges in between 3 kilohertz (KHz) to 10 gigahertz (GHz). The data transponder devices 102, 104 are either passive or active. The passive data transponder does not require a power supply whereas the data transponder which is active requires a power supply. The power transmission and communication is wireless.

The data transponder devices 102, 104 comprises a material selected from the group consisting of metal, conductive polymers, metal grids, carbon nanotubes (CNT) layer, graphene, transparent conductive oxides or conductive oxides. The metal is selected from the group consisting of copper, aluminum, silver or platinum. The transparent conductive oxides are selected from the group consisting of zinc oxide or indium tin oxide. The conductive polymers are selected from the group consisting of polyaniline or polyindoles.

The data transponder 102, 104 comprises of a stack of layers consisting of a substrate, an antennae, a chip and an overlay, wherein the substrate and overlay are comprised of a glass or a polymer, wherein the polymer is selected from a group consisting of poly vinyl butyral (PVB), polycarbonate (PC), acoustic PVB, shade band PVB, thermal control PVB, ethylene vinyl acetate (EVA), thermoplastic polyurethane and/or polyvinyl chloride and/or polyester and/or (TPU), ionomer, a thermoplastic material, poly butylene terephthalate (PBT), polyethylenevinylacetate (PET) and/or polycarbonate and/or polypropylene and/or polyethylene and/or polyurethacrylate), polyethylene naphthalate (PEN), polyvinyl chloride (PVC), polyvinyl fluorides (PVf), polyacrylate (PA), polymethyl methacrylate (PMMA), polyurethane (PLR) or combinations thereof.

The data transponder devices 102, 104 are integrated in the laminated glazing 100 by printing, depositing or patching. The data transponder devices 102, 104 can be directly printed onto the first or second substrate 100a, 100b or the interlayer 100c by means of screen printing with multiple layers onto one another. The data transponder devices 102, 104 can also be deposited over the first or second substrate 100a, 100b directly either by physical vapor deposition coating or chemical vapor deposition coating. In some instances, the data transponder devices 102, 104 can be a separate thin film patch which can be fixed optionally by adhesive either on first or second substrate 100a, 100b or on the interlayer 100c.

Optionally, the data transponder devices 102, 104 are cured during the integration in the laminated glazing 100. The curing of the data transponder devices 102, 104 can be done by infrared or ultraviolet rays.

In an embodiment, the data transponder devices 102, 104 comprises of antenna 102a, 104a and integrated circuit 102b, 104b. The antenna 102a, 104a and the integrated circuit 102b, 104b are coupled together. The antenna 102a, 104a are for receiving and transmitting signals. The integrated circuit 102b, 104b are for processing the information. The integrated circuit 102b, 104b comprises of a memory. The memory consists of a read-only portion and re-writable portion. The read-only portion store data which cannot be altered and the re-writable portion store data which can be altered. The integrated circuit 102b, 104b is in a form of a chip.

Figure 4:
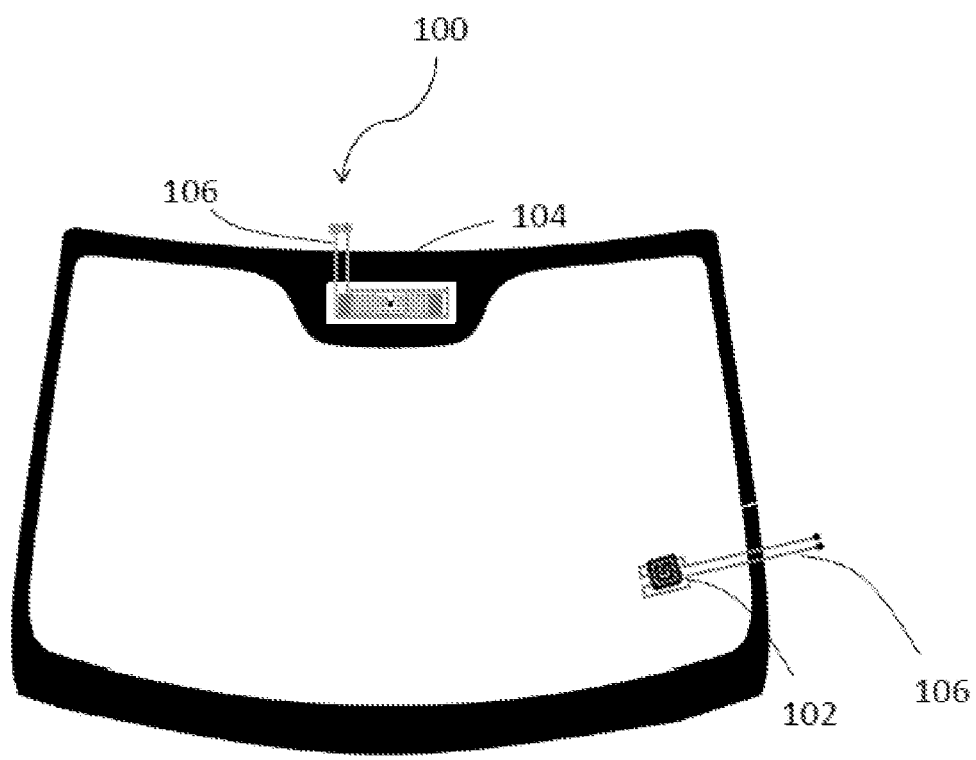
FIG. 4 illustrates a plan view of a laminated glazing according to the present disclosure.

FIG. 4 illustrates a laminated glazing 100 for a vehicle herein, comprising of NFC device 102 and radio frequency identification (RFID) tag 104. The laminated glazing 100 is provided with embedded data transponders such as NFC device 102 and RFID tag 104. A heating element 106 is spaced around the embedded NFC device 102 and RFID tag 104 for rapidly heating the region around the antenna 102a and 102b of the data transponder. Typically, the heating element 106, which provides rapid heating around a particular region, is made of a metal for conducting electricity. The heating element 106 is a sticker or screen-printed with conductive ink. In an embodiment, the heating element 106 is incorporated between the substrates 100a, 100b of the laminated glazing 100 and more specifically, the heating element 106 is provided on the interlayer 100c or in the inner face. The readability of data transponders such as NFC device 102 and RFID tag 104 are affected due to several external environmental factors such as fogging, icing etc., by having the heating element 106, the performance of the data transponders in colder conditions are improved.

Figure 5:
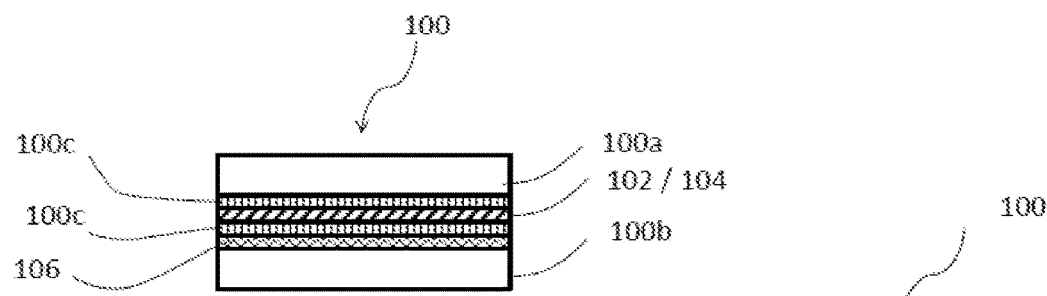
FIG. 5 illustrates a cross section view of a laminated glazing, according to an embodiment of the present disclosure.

FIG. 5 illustrates a cross section view of laminated glazing 100. One or both the first substrate 100a and second substrate 100b is a glass or a polymer. One or more interlayers 100c provided between the first substrate 100a and second substrate 100b to form the laminated assembly. The data transponder device 102 and 104 are integrated between the first substrate 100a, second substrate 100b, or one or more interlayers 100c.

Figure 6:
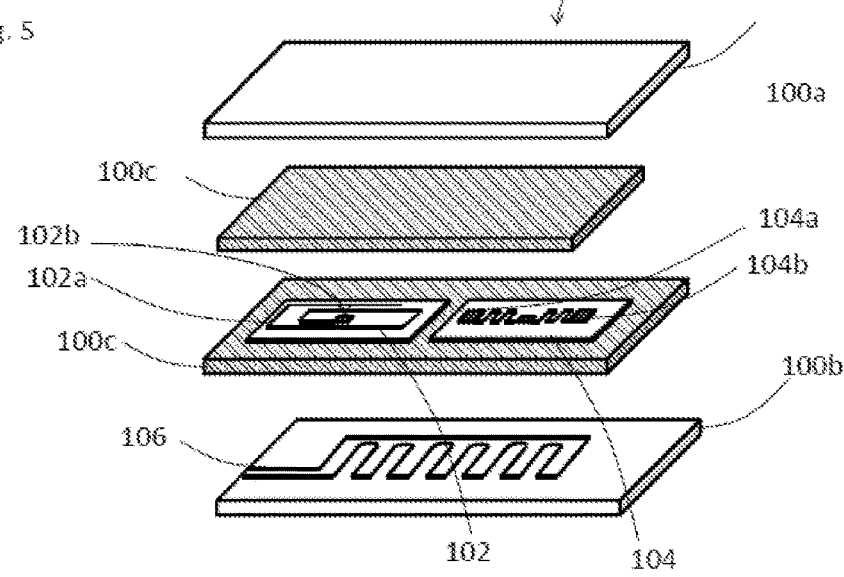
FIG. 6 illustrates an exploded view of a laminated glazing, according to an embodiment of the present disclosure.

FIG. 6 illustrates an exploded view of a laminated glazing 100. The laminated glazing 100 comprises first substrate 100a, second substrate 100b, two interlayers 100c and data transponders such as NFC device 102 and/or RFID tag 104. The interlayers 100c are provided on the inner face of the first substrate 100a. The interlayers 100c is intermediate the first and second substrates 100a and 100b respectively. The NFC device 102 comprises of an antenna 102a and an integrated circuit 102b. The RFID tag 104 comprises of an antenna 104a and an integrated circuit 104b. The heating element 106 provided between the first and the second substrate 100a and 100b respectively and spaced around the data transponder device such as NFC device 102 and RFID tag 104 for rapidly heating the antenna 102a and 104a respectively.

In an embodiment, the data transponder devices 102, 104 is adapted to provide data including but not limited to vehicle identification numbers (VIN), motor vehicle registration status, motor vehicle inspection status, insurance compliance status, amber alert, emission compliance status, speed, toll account information, global positioning system (GPS) data, location status, motor vehicle security/retrieval status, vehicle registration data, sensor data, safety certification data, emission control certification data, contact information, product identification number, anti-theft system, lock-unlock doors, power-on and engine starting and closing control, initiate connection to internet terminal, initiate communication with the Wi-Fi modules, changing modes of a mobile device based on external factors, switching on/off electronic devices.

In an alternate embodiment, the integration of the data transponder devices 102, 104 along with the laminated glazing 100 can be done by means of placing it along with the sun control film. The film can be installed on outer surface or the internal surface of the laminated glazing and can be placed in such a way that it can cover-up the data transponder devices 102, 104 embedded in the laminated glazing 100 so as to ensure its intact within.

Figure 7:
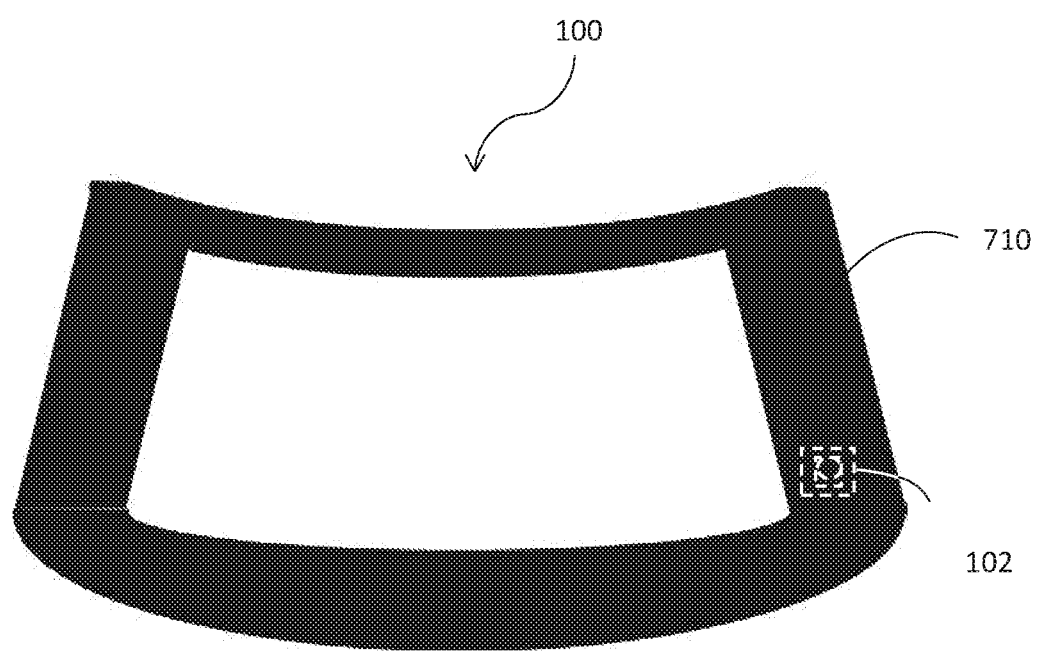
FIG. 7 illustrates a plan view of a laminated glazing integrated with a data transponder device in ceramic masking region according to an embodiment of the present disclosure.

In an embodiment, zone isolation for data transponder devices 102, 104 in metal based coated laminated glazing is provided. The data transponder device 102, 104 readability is significantly affected when it comes to be over the metal parts. It is always advisable to place the data transponder devices 102, 104 away from the metal surface to avoid readability issues. The laminated glazing 100 when coated with the metal oxide coating, the data transponder devices 102, 104 placed over may have issues with respect to readability. In order to avoid the issue, local isolation for data transponder devices 102, 104 has been done. The ideal location for providing the isolation for data transponder devices 102, 104 is the mirror button area which is placed away from the metal body of the vehicle. There are two zones where the data transponder devices 102, 104 can be placed. The one region is visible region and other one is invisible region behind the ceramic masking region 710. The advantage of embedding the data transponder devices 102, 104 in the ceramic masking region 710 is to provide protection against the ultraviolet rays. FIG. 7 illustrates a plan view of a laminated glazing integrated with a data transponder device 102 in ceramic masking region 710, which is located on the border regions of the windshield to provide ultraviolet protection to the data transponder device 102.

Figure 8:
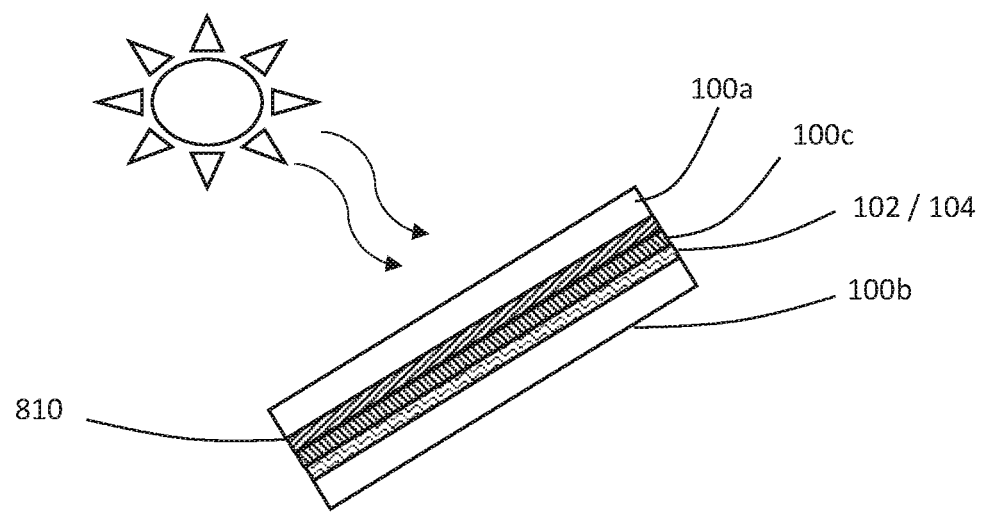
FIG. 8 illustrates a cross section view of a laminated glazing provided with an UV protection layer according to an embodiment of the present disclosure.

FIG. 8 illustrates a cross section view of a laminated glazing provided with an UV protection layer 810 to provide ultraviolet protection to the data transponder device 102, 104 comprising epoxy resins with additives selected from a group consisting of acrylate-urethane based coatings. Titanium dioxide (Tio2), Zinc Oxide (ZnO) nanoparticles embedded acrylic coatings, Aluminum fluoride (AlF3), Sodium hexafluoroaluminate (Na3AlF6), Magnesium fluoride (MgF2), Lanthanum trifluoride (LaF3), Gadolinium Fluoride (GdF3), or combinations thereof.

Figure 9:
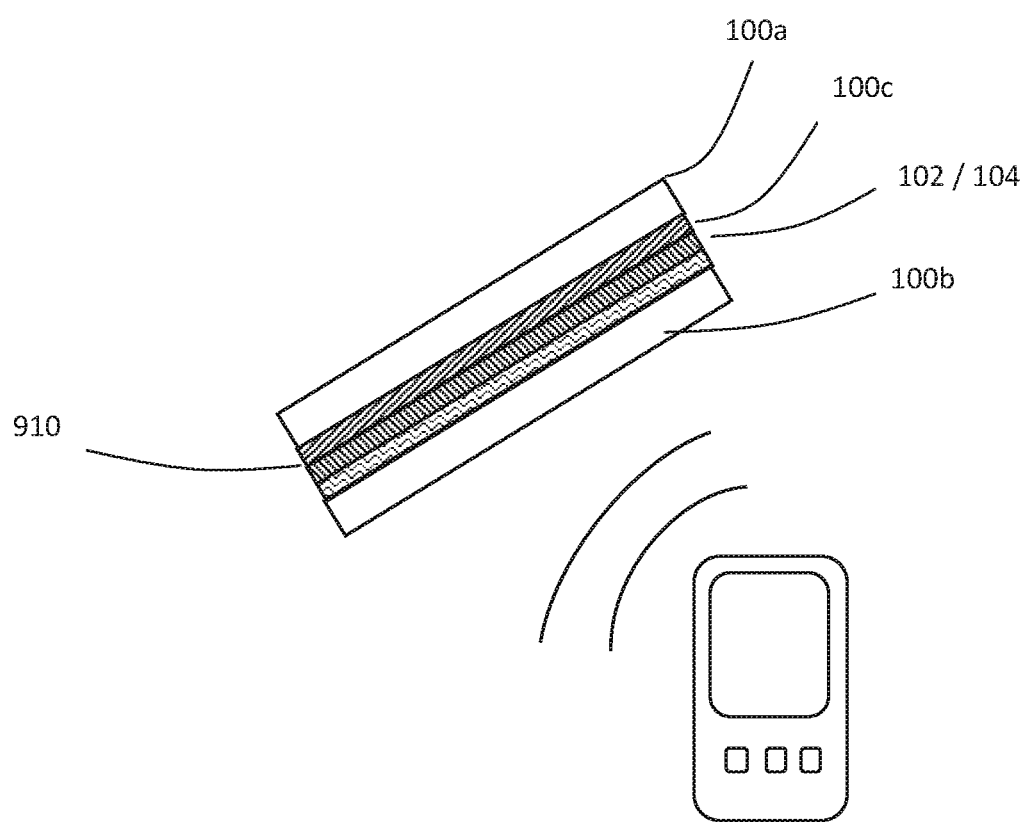
FIG. 9 illustrates a cross section view of a laminated glazing provided with an access shielding layer according to an embodiment of the present disclosure.

FIG. 9 illustrates a cross section view of a laminated glazing provided with an access-shielding layer 910 according to an embodiment of the present disclosure to provide selective reading of the data transponder device 102, 104 from outside/inside the vehicle depending on the location and arrangement of the access-shielding layer 910 and the detection device. This access-shielding layer 910 comprises of a material, which can reflect or absorb the radio waves to provide selective reading of the transponder device 102, 104. The accessibility of the data transponder devices 102, 104 from one of the first or second substrate 100a/100b may be obstructed so that the authorized user can only access the data transponder devices 102, 104. The accessibility of data transponders 102, 104 is obstructed to maintain information privacy.

Figure 10:
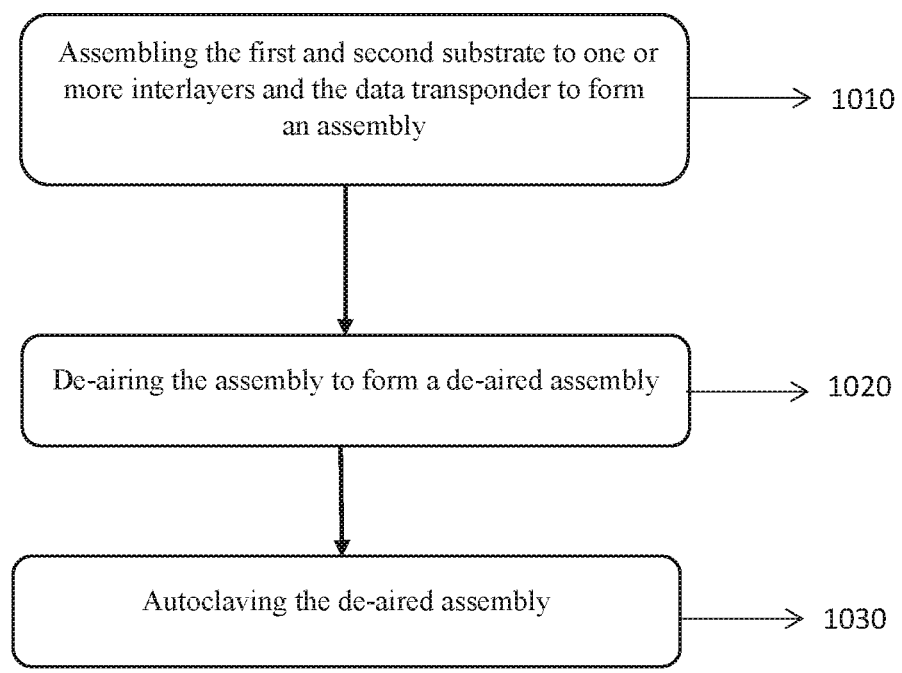
FIG. 10 illustrates a flowchart of the method of manufacturing the laminated glazing for automobile, according to an embodiment of the present disclosure.

FIG. 10 illustrates the flowchart for a method of manufacturing a laminated glazing used in vehicles with data transponders embedded. Step 1010 includes assembling the first and second substrate 100a, 100b to one or more interlayers 100c and the data transponder 102, 104 to form an assembly. The step of assembling is selected from the group consisting of lamination, adhesive bonding, placing, and completion of the laminated glass pane. Step 1020 includes de-airing the assembly to form a de-aired assembly. De-airing is a crucial step in formation of laminated curved article. The assembly is kept under vacuum and is heat treated to remove air trapped in between the assembly. During de-airing process the entrapped air between the substrates, interlayers and data transponder device along with connector element is removed to create preliminary adhesion. The de-airing is done by means of having a rubber ring which seals the complete edges of the assembly. The ring is designed to 95% of the actual assembly circumference and further to accommodate in case the connector element is partially extended portion. The suction takes place by removing the air which is entrapped in between the assembly. The ring has one exit hose through which the air is removed. After the de-airing step the assembly is substantially transparent. If there is cloudiness in the assembly, then it means that air is trapper between the assembly. Alternatively, the interlayer 100c is provided with pores (pin holes) for volatiles to escape during the de-airing process. Step 1030 autoclaving the de-aired assembly to form the data transponder 102, 104 integrated laminated glazing.

EXAMPLES

The standard tests were performed on the data transponder embedded laminated glazing samples to study the effect on the read range, readability counts, location for data transponder in the laminated glazing and data integrity. The read range is defined as maximum distance for detecting the data transponder by the detector. Readability counts are defined as number of time the tag responded to the detector in a minute, Location of the data transponder in the laminated glazing is defined as the placement of the data transponder in the laminate. Data integrity check is defined as the determination of information lost in the data transponder.

Example 1: Storage Stability Test

The data transponder embedded laminated glazing samples were kept at 80° C. for 24 hours and the effect on the read range, readability counts, location for data transponder in the laminated glazing and data integrity was checked. Table 1 shows the different parameters checked after the samples were kept at 80° C. for 24 hours.

TABLE 1

| Sample No. | Location | Data Integrity | Read Range | Readability Count |
|---|---|---|---|---|
| Sample 1 | Inner face of first substrate | Yes | 14.5 | 4274 |
| Sample 2 | Inner face of second substrate | Yes | 14.5 | 3449 |
| Sample 3 | Between two interlayers | Yes | 14.5 | 5925 |

Results from storage stability test (Table 1) showed that the readability was higher when the data transponder device embedded between two interlayers of the laminate glazing. In addition to this, when the data transponder device was embedded on the inner face of the first substrate, higher data readability was achieved.

Example 2: Heat Resistance Test

The data transponder embedded laminated glazing samples were kept at 100° C. for 400 hours and the effect on the read range, readability counts, location for data transponder in the laminated glazing and data integrity was checked. Table 2 shows the different parameters checked after the samples were kept at 100° C. for 400 hours.

TABLE 2

| Sample No. | Location | Data Integrity | Read Range | Readability Count |
|---|---|---|---|---|
| Sample 1 | Inner face of first substrate | Yes | 15 | 9029 |
| Sample 2 | Inner face of second substrate | Yes | 15 | 10006 |
| Sample 3 | Between two interlayers | Yes | 15 | 10537 |

Results from heat resistance test (Table 2) showed that the readability was higher when the data transponder device embedded between two interlayers of the laminate glazing. In addition to this, when the data transponder device was embedded on the inner face of the second substrate, higher data readability was achieved.

Example 3: Thermal Cycle Resistance Test

The data transponder embedded laminated glazing samples were kept at following conditions firstly 30° C. for 2 hours, secondly room temperature for 30 minutes, thirdly 100° C. for 2 hours and finally room temperature for 30 minutes. The effect on the read range, readability counts, location for data transponder in the laminated glazing and data integrity was checked for the samples. Table 3 shows the different parameters checked after the samples were subjected to above mentioned conditions.

TABLE 3

| Sample No. | Location | Data Integrity | Read Range | Readability Count |
|---|---|---|---|---|
| Sample 1 | Inner face of first substrate | Yes | 14.5 | 18852 |
| Sample 2 | Inner face of second substrate | Yes | 14.5 | 11484 |
| Sample 3 | Between two interlayers | Yes | 14.5 | 1806 |

Results from thermal cycle resistance test (Table 3) showed that the readability was higher when the data transponder device embedded on the inner face of the first substrate of the laminate glazing. In addition to this, when the data transponder device was embedded on the inner face of the second substrate, very higher data readability was achieved than embedded between two interlayers.

Example 4: High Light Resistance Test

The data transponder embedded laminated glazing samples were irradiated with full solar spectra at 65 W/m$^2$ for 2700 hours and the effect on the read range, readability counts, location for data transponder in the laminated glazing and data integrity was checked for the samples. Table 4 shows the different parameters checked after the samples were irradiated at 65 W/m$^2$ for 2700 hours.

TABLE 4

| Sample No. | Location | Data Integrity | Read Range | Readability Count |
|---|---|---|---|---|
| Sample 1 | Inner face of first substrate | Yes | 15 | 16895 |
| Sample 2 | Inner face of second substrate | Yes | 14 | 25801 |
| Sample 3 | Between two interlayers | Yes | 15 | 23809 |

Results from high light resistance test (Table 4) showed that the readability was higher when the data transponder device embedded on the inner face of the second substrate of the laminate glazing. In addition to this, when the data transponder device embedded between two interlayers, higher data readability was achieved.

Example 5: Long Term Reliability Test

The data transponder embedded laminated glazing samples were kept inside an environmental chamber at a temperature of 65° C. and relative humidity of 95% for 15 weeks and the effect on the read range, readability counts, location for data transponder in the laminated glazing and data integrity was checked for the samples. Table 4 shows the different parameters checked after the samples were kept at a temperature of 65° C. and relative humidity of 95% for 15 weeks.

TABLE 4

| Sample No. | Location | Data Integrity | Read Range | Readability Count |
|---|---|---|---|---|
| Sample 1 | Inner face of first substrate | Yes | 14 | 3221 |
| Sample 2 | Inner face of second substrate | Yes | 14 | 6579 |
| Sample 3 | Between two interlayers | Yes | 14 | 6840 |

Results from long-term reliability test (Table 2) showed that the readability was higher when the data transponder device embedded between two interlayers of the laminate glazing. In addition to this, when the data transponder device was embedded on the inner face of the second substrate, higher data readability was achieved.

From the above results, it was established that the data transponders should be embedded on inner face of the first substrate of the laminated glazing 100 to achieve best readability.

INDUSTRIAL APPLICATION

The laminated glazing of the present disclosure is a laminated glass pane which can be installed in a building or a windshield, windscreen or sunroof or automobile glazing which can be installed in a motor vehicle.

According to the basic construction described above, the automobile glazing system of the present invention may be subject to changes in materials, dimensions, constructive details and/or functional and/or ornamental configuration without departing from the scope of the protection claimed.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

LIST OF ELEMENTS

100 Laminated glazing
100a First substrate
100b Second substrate
100c interlayer
102 NFC device
102a NFC antenna
102b NFC integrated circuit
104 RF ID tag
104a RF ID antenna
104b RF ID integrated circuit
106 Heating element
710 Ceramic masking region
810 UV protection layer
910 Access-shielding layer
1010 Step
1020 Step
1030 Step

We claim:

1. A laminated glazing comprising:
 a first substrate including an outer face and an inner face;
 one or more interlayers disposed on the inner face of the first substrate;
 a second substrate disposed on the one or more interlayers including an outer face and an inner face;
 at least one data transponder device comprising an antenna and an integrated circuit disposed on at least one of the one or more interlayers; said one or more interlayers being placed in between the first and second substrate; and
 one or more heating elements provided between the first substrate and the second substrate, wherein the one or more heating elements is/are positioned around the data transponder device at a pre-defined distance therein to provide a local heating of a region around the antenna and thereby improve readability of the data transponder.

2. The laminated glazing as claimed in claim 1, further comprising a ceramic masking region around the edges of the laminated glazing.

3. The laminated glazing as claimed in claim 1, wherein the data transponder device is positioned on a ceramic masking region, thereby configured to provide ultraviolet protection to the data transponder device.

4. The laminated glazing as claimed in claim 1, further comprising an access shielding layer essentially consisting of one more organic or inorganic substances that can reflect or absorb the radio waves.

5. The laminated glazing as claimed in claim 1, further comprising a UV protection layer configured to provide ultraviolet protection to the data transponder device comprising epoxy resins with additives, wherein the additive is selected from a group consisting of acrylate-urethane based coatings, Titanium dioxide ($TiO_2$), Zinc Oxide (ZnO) nanoparticles embedded acrylic coatings, Aluminum fluoride ($AlF_3$), Sodium hexafluoroaluminate ($Na_3AlF_6$), Magnesium fluoride ($MgF_2$), Lanthanum trifluoride ($LaF_3$), Gadolinium Fluoride ($GdF_3$) and any combinations thereof.

6. The laminated glazing as claimed in claim 1, wherein the first substrate or the second substrate is of varying thickness.

7. The laminated glazing as claimed in claim 6, wherein the thickness of the first substrate or the second substrate is at least 0.5 mm.

8. The laminated glazing as claimed in claim 1, wherein the data transponder comprises a stack of layers consisting of a substrate, an antennae, a chip and an overlay, wherein the substrate and overlay are comprised of a glass or a polymer, wherein the polymer is selected from a group consisting of poly vinyl butyral (PVB), polycarbonate (PC), acoustic PVB, shade band PVB, thermal control PVB, ethylene vinyl acetate (EVA), thermoplastic polyurethane and/or polyvinyl chloride and/or polyester and/or (TPU), ionomer, a thermoplastic material, polybutylene terephthalate (PBT), polyethylenevinylacetate (PET) and/or polycarbonate and/or polypropylene and/or polyethylene and/or polyurethacrylate), polyethylene naphthalate (PEN), polyvinyl chloride (PVC), polyvinyl fluorides (PVf), polyacrylate (PA), polymethyl methacrylate (PMMA), polyurethane (PUR) and any combinations thereof.

9. The laminated glazing as claimed in claim 8, wherein the polymer is a polycarbonate (PC) or a polypropylene (PP).

10. The laminated glazing as claimed in claim 1, wherein at least one of the first substrate and the second substrate is a glass or a polymer.

11. The laminated glazing as claimed in claim 1, wherein the shape of the first substrate or the second substrate is flat, curved, wedged or contoured.

12. The laminated glazing as claimed in claim 1, wherein the interlayer comprises a polymer.

13. The laminated glazing as claimed in claim 12, wherein the polymer is selected from a group consisting of poly vinyl butyral (PVB), polycarbonate (PC), acoustic PVB, shade band PVB, thermal control PVB, ethylene vinyl acetate (EVA), thermoplastic polyurethane (TPU), ionomer, a thermoplastic material, polybutylene terephthalate (PBT), polyethylenevinylacetate (PET), polyethylene naphthalate (PEN), polyvinyl chloride (PVC), polyvinyl fluorides (PVf), polyacrylate (PA), polymethyl methacrylate (PMMA), polyurethane (PUR) and any combinations thereof.

14. The laminated glazing as claimed in claim 1, wherein the data transponder device is sandwiched between the first substrate and the second substrate.

15. The laminated glazing as claimed in claim 1, wherein the data transponder device is configured to communicate data wirelessly with a detecting device and wherein the detecting device is at least one of a radio frequency (RF) reader, a handheld device, a mobile device, a cell phone, a vehicle key, and a tablet.

16. The laminated glazing as claimed in claim 1, wherein the data communicated wirelessly by the data transponder device with the detecting device comprises at least one of vehicle identification number (VIN), motor vehicle registration status, motor vehicle inspection status, insurance compliance status, amber alert, emission compliance status, speed, toll account information, global positioning system (GPS) data, location status, motor vehicle security/retrieval status, vehicle registration data, sensor data, safety certification data, emission control certification data, contact information, product identification number, anti-theft system, lock-unlock doors, power-on and engine starting and closing control, initiate connection to internet terminal, initiate communication with the Wi-Fi modules, changing modes of a mobile device based on external factors, switching on/off electronic devices or combinations thereof.

17. The laminated glazing as claimed in claim 1, wherein the data transponder device is operated and powered wirelessly by the detecting device.

18. The laminated glazing as claimed in claim 1, wherein the thickness of the interlayer is uniform or non-uniform.

19. The laminated glazing as claimed in claim 1, wherein the interlayer is modified to accommodate at least one data transponder device, by a method selected from a group consisting of cutting, pressing, grinding, heating and any combinations thereof.

20. The laminated glazing as claimed in claim 1, wherein the data transponder device has a thickness in the range of 50 μm to 500 μm.

21. The laminated glazing as claimed in claim 1, wherein the data transponder device is at least one of a flexible element and a rigid element.

22. The laminated glazing as claimed in claim 1, wherein the data transponder device is formed of material selected from a group consisting of metal, conductive polymers, metal grids, carbon nanotubes (CNT) layer, graphene, and transparent conductive oxides.

23. The laminated glazing as claimed in claim 1, wherein the data transponder device includes at least one of an active RFID tag, a passive RFID tag and a semi-passive RFID tag.

24. The laminated glazing as claimed in claim 1, wherein the data transponder device is integrated in the laminated glazing by printing, depositing or other suitable methods.

25. The laminated glazing as claimed in claim 1, wherein the integrated circuit comprises a memory.

26. The laminated glazing as claimed in claim 25, wherein the memory includes a read only area with a pre-defined information stored therein and a read-write portion configurable by a user.

27. The laminated glazing as claimed in claim 1, wherein the antenna is a NFC antenna configured to operate at a frequency of 13.6 MHz.

28. The laminated glazing as claimed in claim 1, wherein the antenna is a high frequency antenna configured to operate in a frequency range between from 3 kilohertz (KHz) to 10 gigahertz (GHz).

29. The laminated glazing as claimed in claim 1, wherein the laminated glazing is a windshield, windscreen and/or sunroof of an automobile.

30. A method of manufacturing a laminated glazing as claimed in claim 2, wherein the method comprising:
    assembling first and second substrate along with one or more data transponder device at a pre-defined location to one or more interlayers to form a laminated assembly;
    de-airing the laminated assembly based on the size, number and type of data transponder device; and
    autoclaving the de-aired laminated assembly in successive time steps involving multiple pressure and temperature values to form the data transponder device integrated laminated glazing.

31. The laminated glazing as claimed in claim 1, wherein the one or more interlayers are a single layer.

32. The laminated glazing as claimed in claim 1, wherein the one or more heating elements are spaced around the data transponder device to heat the antenna for better readability.

* * * * *

UNITED STATES PATENT AND TRADEMARK OFFICE
CERTIFICATE OF CORRECTION

PATENT NO. : 11,494,605 B2
APPLICATION NO. : 16/620310
DATED : November 8, 2022
INVENTOR(S) : Arunvel Thangamani et al.

It is certified that error appears in the above-identified patent and that said Letters Patent is hereby corrected as shown below:

In the Claims

In Claim 30 at Column 14, Line 21 should read as follows:
30. A method of manufacturing a laminated glazing as claimed in claim 1, wherein the method comprising:
assembling first and second substrate along with one or more data transponder device at a pre-defined location to one or more interlayers to form a laminated assembly;
de-airing the laminated assembly based on the size, number and type of data transponder device; and autoclaving the de-aired laminated assembly in successive time steps involving multiple pressure and temperature values to form the data transponder device integrated laminated glazing Signed and Sealed this
Twenty-seventh Day of December, 2022

Katherine Kelly Vidal
*Director of the United States Patent and Trademark Office*